United States Patent
Woxland et al.

(10) Patent No.: US 10,389,537 B2
(45) Date of Patent: *Aug. 20, 2019

(54) SYSTEM AND METHOD FOR WIRELESS NETWORK MANAGEMENT

(71) Applicants: AT&T Mobility II LLC, Atlanta, GA (US); AT&T INTELLECTUAL PROPERTY I, L.P., Atlanta, GA (US)

(72) Inventors: Morgan D. Woxland, Cumming, GA (US); Jonathan Davis, Monroe, GA (US)

(73) Assignees: AT&T MOBILITY II LC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,031

(22) Filed: Jan. 25, 2018

(65) Prior Publication Data

US 2018/0152303 A1 May 31, 2018

Related U.S. Application Data

(63) Continuation of application No. 14/938,706, filed on Nov. 11, 2015, now Pat. No. 9,900,162.

(51) Int. Cl.
*H04L 29/00* (2006.01)
*H04L 9/32* (2006.01)
(Continued)

(52) U.S. Cl.
CPC .......... *H04L 9/3263* (2013.01); *H04L 9/3271* (2013.01); *H04L 63/105* (2013.01);
(Continued)

(58) Field of Classification Search
CPC ... H04L 63/08; H04L 63/062; H04L 12/2807; H04L 63/20; H04L 9/0844
See application file for complete search history.

(56) References Cited

U.S. PATENT DOCUMENTS 6,453,159 B1 9/2002 Lewis
6,526,506 B1 2/2003 Lewis
(Continued)

FOREIGN PATENT DOCUMENTS

EP          1484856 B1    10/2008
WO    2015027027 A1    2/2015

OTHER PUBLICATIONS

Sthultz, M., et al, "Wireless Insecurities," Advances in Computers (2006) http://www.sciencedirect.com/science/article/pii/S0065245805670052, 1 pp.

(Continued)

*Primary Examiner* — Ghazal B Shehni
(74) *Attorney, Agent, or Firm* — Toler Law Group, PC

(57) ABSTRACT

A method includes receiving a first message from a wireless device via a network. The method includes determining a device type of the wireless device. In response to determining that the device type satisfies a criterion, sending a second message granting the wireless device access to the network subject to a first restriction level and sending a network access request to a second device associated with an operator of the access point. The second message includes a first key to grant the wireless device access to the network subject to the first restriction level. The method includes receiving a response to the network access request from the second device. The method also includes determining, based on the response, based on the response, whether to grant the wireless device access to the network subject to a second restriction level, the second restriction level less restrictive than the first restriction level.

19 Claims, 5 Drawing Sheets

(51) Int. Cl.
*H04W 48/04* (2009.01)
*H04W 12/04* (2009.01)
*H04W 12/08* (2009.01)
*H04L 29/06* (2006.01)

(52) U.S. Cl.
CPC ........... *H04W 12/04* (2013.01); *H04W 12/08* (2013.01); *H04W 48/04* (2013.01); *H04L 2209/80* (2013.01)

(56) References Cited

U.S. PATENT DOCUMENTS

| | | | |
|---|---|---|---|
| 6,965,674 | B2 | 11/2005 | Whelan et al. |
| 7,024,553 | B1 | 4/2006 | Morimoto |
| 7,490,348 | B1 | 2/2009 | Harris |
| 7,627,123 | B2* | 12/2009 | Conway .............. H04L 63/02 380/247 |
| 7,835,525 | B2 | 11/2010 | Jang et al. |
| 8,001,584 | B2 | 8/2011 | Lortz et al. |
| 8,090,106 | B2 | 1/2012 | Teng et al. |
| 8,224,289 | B2 | 7/2012 | Poltorak |
| 8,281,392 | B2 | 10/2012 | Sinha et al. |
| 8,619,674 | B1 | 12/2013 | Shipley et al. |
| 8,731,200 | B2 | 5/2014 | Carter et al. |
| 8,781,483 | B2 | 7/2014 | Ch'Ng |
| 8,813,194 | B2 | 8/2014 | Sposato et al. |
| 8,904,177 | B2 | 12/2014 | Patil et al. |
| 8,913,959 | B1 | 12/2014 | Pochop, Jr. |
| 8,942,375 | B2 | 1/2015 | Frank et al. |
| 2011/0255525 | A1 | 10/2011 | Powell et al. |
| 2012/0083270 | A1 | 4/2012 | Robbins et al. |
| 2012/0282921 | A1 | 11/2012 | Motola et al. |
| 2014/0082728 | A1* | 3/2014 | Kim .............. H04L 63/1416 726/23 |
| 2014/0153407 | A1 | 6/2014 | Xu et al. |

OTHER PUBLICATIONS

Lashkari, A., et al, A Survey on Wireless Security Protocols (WEP, WPA and WPA2/802.11i), IEEE International Conference on Computer Science and Information Technology, Aug. 8-11, 2009, http ://ieeexplore. ieee. org/xpl/log in .jsp ?tp= &a rn umber= 5234856, 2 pp.

Sheldon, F.T., "The Insecurity of Wireless Networks", IEEE Security & Privacy (May 1, 2012), http ://ieeexplore. ieee.org/xpl/ log in .jsp ?tp= &a rn umber= 6193090, 2 pp.

\* cited by examiner

SYSTEM AND METHOD FOR WIRELESS NETWORK MANAGEMENT

PRIORITY CLAIM

This application is a continuation of, and claims priority from, U.S. patent application Ser. No. 14/938,706, filed Nov. 11, 2015, which is hereby incorporated by reference in its entirety.

FIELD OF THE DISCLOSURE

The present disclosure is generally related to wireless network management.

BACKGROUND

Many wireless networks (e.g., Wi-Fi networks) are protected by security protocols (e.g., wired equivalent privacy (WEP), Wi-Fi protected access (WPA), etc.) that use a security key. Security keys may be difficult to remember so a network administrator may have to repeatedly look up the security key to distribute the security key to new users or devices.

In addition, wireless devices that do not have user interfaces are becoming increasingly common. To illustrate, household devices, such as lighting systems, appliances, security systems, etc. are increasingly being connected to the Internet. Such devices may not have user interfaces to receive input of a security key.

DETAILED DESCRIPTION

Figure 1:
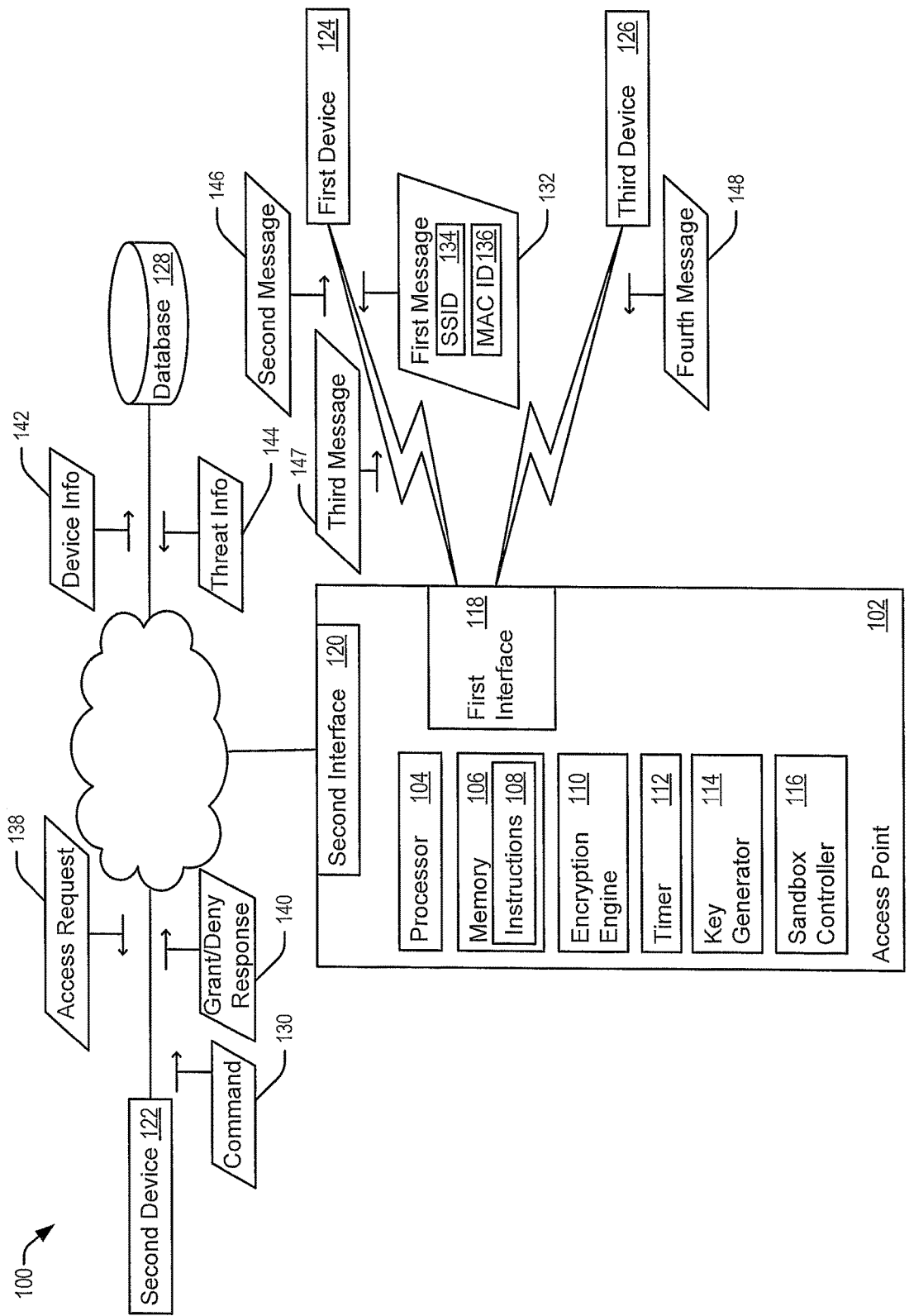
FIG. 1 is a diagram of a particular example of a system for wireless network management.

The present disclosure describes systems and methods of wireless network management. For example, the disclosed systems and methods may enable a wireless access point to grant a wireless device access to a network that is secured using an access key even though the wireless device does not have access to the access key. Further, the wireless device can be granted access to the network even if the wireless device does not have a user interface (e.g., a display) that enables configuration of network settings. The wireless access point may generate a "sandbox" associated with the wireless device. The sandbox may permit the wireless device to access some resources of the network, but may not permit the wireless device to access other resources of the network. While the wireless device has access to the network via the sandbox, the access point may seek approval (e.g., from a network administrator) to permit the wireless device access to resources of the network that are not accessible via the sandbox. Additionally or in the alternative, while the wireless device has access to the network via the sandbox, the access point may assess whether the wireless device is a threat (e.g., is or may be malicious). For example, the wireless access point may monitor activity associated with the wireless device and determine a threat level associated with the wireless device based on the activity. As another example, the wireless access point may query a database to determine threat information associated with the wireless device. Further, when the wireless device is granted access to the network (either constrained by the sandbox or not), the access point may generate a key (or a portion of a key) used to secure communications between the access point and the wireless device. The access point and the wireless device may use a key exchange process to exchange key information. The key may be automatically updated periodically. Thus, the key can be automatically generated, updated, and/or exchanged such that the network administrator does not need to know the key.

In a particular implementation, a method includes receiving, at an access point of a network, a first message from a wireless device. For example, the first message may include an advertisement or beacon. In another example, the first message may include a request for network access. The method further includes determining a device type of the wireless device. The access point may compare the device type of the wireless device to criteria to determine, for example, whether to automatically grant the wireless device access to the network, whether to automatically deny the wireless device access to the network, or whether to prompt a network administrator regarding whether to grant the wireless device access to the network. In response to determining that the device type satisfies a criterion (e.g., a particular criterion associated with automatically granting the wireless device restricted access to the network), the method includes sending, to the wireless device, a second message granting the wireless device access to the network subject to a first restriction level and sending a network access request to a second device (e.g., a device associated with a network administrator). The method may further include receiving a response to the network access request from the second device and determining, based on the response, whether to grant the wireless device access to the network subject to a second restriction level.

In another implementation, an apparatus (e.g., a wireless access point) includes a processor and a memory storing instructions that are executable by the processor. The instructions, when executed by the processor to cause the processor to perform operations including receiving a first message from a wireless device. The operations also include determining a device type of the wireless device. The operations also include, in response to determining that the device type satisfies a criterion, causing a second message (granting the wireless device access to a network subject to a first restriction level) to be sent to the wireless device and causing a network access request to be sent to a second device. The operations may also include receiving a response to the network access request from the second device and determining, based on the response, whether to grant the wireless device access to the network subject to a second restriction level.

In yet another implementation, a computer-readable storage device stores instructions that are executable by a processor to cause the processor to perform operations including receiving a first message from a wireless device. The operations also include determining a device type of the wireless device. The operations further include, in response to determining that the device type satisfies a criterion, causing a second message (granting the wireless device access to a network subject to a first restriction level) to be sent to the wireless device and causing a network access request to be sent to a second device. The operations may also include receiving a response to the network access request from the second device and determining, based on the response, whether to grant the wireless device access to the network subject to a second restriction level.

FIG. 1 is a diagram of a particular example of a system 100 for wireless network management. The system 100 includes a wireless access point 102 and several other devices, including a first device 124, a second device 122, and a third device 126. The wireless access point 102 may enable wireless devices to communicate as part of a wireless local area network (WLAN), such as a wireless network that operates in conformance with an Institute for Electrical and Electronics Engineers (IEEE) wireless communication specification (e.g., an IEEE 802.11 specification, an IEEE 802.16 specification, etc.). In other examples, the wireless access point 102 may enable or participate in wireless communication in a personal area network, such as a personal area network that operates in conformance with a Bluetooth specification, a Bluetooth low energy (BLE) specification, or some other personal area network communications specification (Bluetooth is a registered trademark of Bluetooth SIG, Inc., a Delaware corporation). The wireless access point 102 may also act as a gateway device to enable at least some of the devices of the local area network to communicate with other devices via a wide area network, such as the Internet.

The wireless access point 102 may include a processor 104 and a memory 106 accessible to the processor 104. The memory 106 may store instructions 108 that are executable by the processor 104 to cause various functions of the wireless access point 102 (as described further below) to be performed. In a particular example, the first device 124, the second device 122, and the third device 126 each include a processor and a memory (not shown in FIG. 1).

The wireless access point 102 may also be configured to communicate with an administrator device (e.g., the second device 122) associated with an administrator of the wireless access point 102. The wireless access point 102 may communicate with the second device 122 via the local area network supported by the wireless access point 102, or may communicate with the second device 122 via a wide area network. For example, the second device 122 may include a mobile device, such as a mobile phone or portable computing device. In this example, the wireless access point 102 may transmit messages to the second device 122 via a wide area wired and/or wireless network, such as a Long-Term Evolution (LTE) network, a Global System for Mobile Communications/Universal Mobile Telecommunications System (GSM/UMTS) network, a wideband code division multiple access (W-CDMA), a CDMA2000 network, the Internet, or any other wide area network. To illustrate, the wireless access point 102 may send messages to the second device 122 using a short messaging service (SMS).

The wireless access point 102 includes a first interface 118 configured to support a wireless local area network. For example, the first interface 118 may be configured to receive a first message 132 from the first device 124 via a wireless signal and to transmit a second message 146 to the first device 124 via a wireless signal.

The wireless access point 102 also includes a second interface 120 configured to communicate via a second network. For example, the second interface 120 may be configured to send an access request 138 via a wired network connection to the second device 122 and to receive a response 140 from the second device 122 via the wired network connection.

The wireless access point 102 also includes various security features, which may be embodied in software (e.g., the instructions 108 executing at the processor 104), in hardware (e.g., one or more application specific integrated circuits), or in a combination thereof. For example, the wireless access point 102 may include an encryption engine 110 configured to encrypt data using an encryption key. To illustrate, the encryption engine 110 may encrypt data sent via the first interface 118 to the first device 124 using an encryption key. The encryption engine 110 may also be configured to decrypt data using the encryption key (or using a different key). In a particular implementation, the encryption engine 110 may use different encryption keys for communications with different devices (e.g., one key for one device). In a particular implementation, the encryption engine 110 may change an encryption key used for a particular device if an access restriction associated with the device changes. For example, the encryption engine 110 may encrypt data for the first device 124 using a first encryption key while access by the first device 124 is subject to a first restriction level and encrypt data for the first device 124 using a second encryption key while access by the wireless device is subject to a second restriction level.

In a particular example, the security features of the wireless access point 102 may also include a timer 112. The timer 112 may track how long a particular key has been in use. In this example, the encryption engine 110 may be configured to change encryption keys periodically based on the timer 112. The security features of the wireless access point 102 may also include a key generator 114 configured to generate at least a portion of an encryption key used by the encryption engine 110 to encrypt data.

The security features of the wireless access point 102 may also include a sandbox controller 116. The sandbox controller 116 may be configured to establish a sandbox or to associate a device with the sandbox to manage the device's access to resources of the network. For example, the sandbox controller 116 may establish a sandbox corresponding to a first restriction level and may associate the first device 124 with the sandbox while the first device 124 has access subject to a first restriction level.

The first device 124 and the third device 126 of FIG. 1 illustrate devices attempting to gain access to a network via the wireless access point 102. The first device 124, the third device 126, or both, may correspond to, include, or be included within a computing device (e.g., a desktop computer, a laptop computer, or a tablet computer), a communication device (e.g., a mobile telephone that includes a WLAN interface), an internet-of-things device, another wireless communication enabled device, or a combination thereof. As used herein, an "internet-of-things" device refers to a device that is not a traditional computing device and that is capable of communicating via a network. For example, an internet-of-things device may not include a display device (or may include a limited-functionality display device, such as a display device that is not configured to display all of the information that the internet-of-things device is capable of communicating via the network) or a port that enables connecting the internet-of-things device directly to a display device. As another example, an internet-of-things device may not include an input device (or may include a limited-functionality input device, such as one or more button or a touch screen, that is not configured to receive input corresponding to all of the input that the internet-of-things device is capable of receiving via the network) or a port that enables connecting the internet-of-things device directly to an input device. Examples of internet-of-things devices may include, but are not limited to, certain control systems (e.g., thermostats, sprinkler controllers, pool controllers, lighting controllers, entertainments system controllers), certain garage door openers, certain sensors (e.g., cameras, motion sensors, audio sensors, smoke detectors, gas detectors, etc.), certain appliances (e.g., dishwashers, clothes washers, clothes dryers, refrigerators, freezers, ovens, cooktops, water heaters, etc.), and certain fixtures (e.g., switches, light fixtures, power outlets, faucets, drains, etc.).

During operation, the first device 124 may send the first message 132, which may be received by the wireless access point 102. The first message 132 may include or correspond to a request to access the local area network. Alternately, or in addition, the first message 132 may include or correspond to a beacon message or advertisement message indicating that the first device 124 is available to join a wireless network. In some examples, the first message 132 is transmitted by the first device 124 in response to the first device 124 detecting an available network (e.g., the network associated with the access point 102). In a particular implementation, the first device 124 may send the first message 132 responsive to power up event at the first device 124 (e.g., the first message 132 may be sent when the first device 124 is turned on or reset). In another particular implementation, the first device 124 may send the first message 132 responsive to entering a particular mode, such as a set up mode or a connection mode. In another particular implementation, the first device 124 may send the first message 132 responsive to detection of an event (such as expiration of a timer) at the first device 124.

The first message 132 may include information identifying the first device 124. For example, the first message 132 may include a service set identifier (SSID) 134 of the first device 124, a media access control identifier (MAC ID) 136 of the first device 124, other information identifying the first device 124 (e.g., a serial number, a name, etc.), information indicating a device type of the first device 124 (e.g., a device type name, a model number, etc.), or a combination thereof.

After receiving the first message 132, the wireless access point 102 may determine an action to be taken responsive to the first message 132. For example, the instructions 108 may include or cause the processor 104 to access settings that indicate various actions that may be taken and criteria for performing the various actions. The actions may include, for example, granting access to the WLAN, granting access to the wide area network, denying access to the WLAN, denying access to the wide area network, or a combination thereof (e.g., granting access to the wireless local area network and denying access to the wide area network). The actions may also include implementing one or more security features. For example, the sandbox controller 116 of the wireless access point 102 may associate the first device 124 with a sandbox. While the first device 124 is associated with the sandbox, the sandbox controller 116 may virtualize and/or limit (e.g., restrict) resources that are accessible to the first device 124. To illustrate, the sandbox controller 116 may permit the first device 124 to send data to and/or receive data from a device (not shown) at a particular network address (e.g., a network address on a white list, or a network address that is not on a black list) and may prevent the first device 124 from sending data to and/or receiving data from another device (not shown) at a different network address (e.g., a network address on a black list, or a network address that is not on a white list). The sandbox controller 116 may also, or in the alternative, monitor communications to and from the first device 124. To illustrate, the sandbox controller 116 may perform deep packet inspection on packets sent to or received from the first device 124. The wireless access point 102 may maintain more than one sandbox. For example, different restriction levels may have different associated sandboxes and/or one or more particular restriction levels may have more than one associated sandbox. As another example, each device that is granted access to the network may be associated with a corresponding sandbox (e.g., one sandbox per device and one device per sandbox). In some implementations, different restriction levels may have different associated data consumption thresholds. A device subject to a particular restriction level may be prevented from exceeding the associated data consumption threshold or a data rate available to the device may be reduced in response to the device exceeding the data consumption threshold. In some implementations, the access point 102 is configured to notify the device, the second device 122, or a combination thereof, that the device has exceeded the data consumption threshold.

One or more of the actions may be performed automatically (e.g., without input from a user or network administrator) by the wireless access point 102 based on associated criteria being satisfied. In a particular implementation, a criterion may be related to a device type of a device (e.g., the first device 124) that is attempting to access the network. In this implementation, the criterion may be satisfied when the device has a first device type and may not be satisfied with the device does not have the first device type (e.g., has a second device type or the device type is unknown). In a particular implementation, the device type may distinguish between a computing device (e.g., a desktop computer, a laptop computer, or a tablet computer), a communication device (e.g., a mobile telephone that includes a WLAN interface), and an internet-of-things device. In another implementation, the device type may be more specific. For example, the device type may distinguish between various types of internet-of-things devices, such as between a sensor and an appliance, or between a particular brand of appliance and another brand of appliance.

The device type may be determined based on information included within the first message 132 or based on other information (not shown) sent by the first device 124 after the first message 132. For example, the first message 132 may include a data element that indicates the device type. As another example, the wireless access point 102 may access a database 128 to determine the device type. To illustrate, the wireless access point 102 may send the SSID 134, the MAC ID 136, other information received from the first device 124, or a combination thereof, to the database 128 and may receive an indication of the device type from the database 128.

In a particular implementation, the criteria may include a first criterion associated with an instruction that causes the processor 104 to automatically grant the first device 124 access to the network subject to a first restriction level. In this example, the first restriction level may indicate particular resources of the network that the first device 124 is able to access. To illustrate, when subject to the first restriction level, the first device 124 may be able to communicate with some devices via the WLAN and unable to communicate with other devices via the WLAN, may be able to communicate with some devices via the wide area network and unable to communicate with other devices via the wide wireless network, or combination thereof. As another illustration, when subject to the first restriction level, the first device 124 may be able to send or receive certain types of data (e.g., text, settings, software, or firmware updates) and unable to send or receive other types of data (e.g., executables).

When the device type satisfies the first criterion, the wireless access point 102 may send the second message 146 to the first device 124 to grant the first device 124 access to the network subject to the first restriction level. The second message 146 may include a first key generated by the key generator 114 (or a data used to generate the first key). For example, the first key may be a Wi-Fi protected access (WPA) key or a wired equivalent privacy (WEP) key. The first key may be used to encrypt communications between the first device 124 and the wireless access point 102. For example, the encryption engine 110 may encrypt data or packets to be sent to the first device 124 using the first key. In other implementations, the first key may be generated based on data exchanged between the wireless access point 102 and the first device 124 according to a key exchange protocol. In some examples, the first device 124 may output a notification in response to second message 146. The notification may include text, audio, video, an image, or a combination thereof. To illustrate, the notification may include text that states "You now have access to [network_id] network," [where network_id] is an SSID of the network. The notification may be output by an output device associated with (e.g., integrated into, coupled to, in communication with) the first device 124. The output device may include a speaker, a display device, or a combination thereof. In some examples, the notification may be stored in a memory device of the first device 124. In particular examples, the notification may be included in the second message 146.

The criteria may also include other criteria and corresponding instructions, such as a second criterion associated with an instruction that causes the processor 104 to automatically grant the first device 124 access to the network subject to a second restriction level, a third criterion associated with an instruction that causes the processor 104 to automatically deny the first device 124 access to the network, a fourth criterion associated with an instruction that causes the processor 104 to send a message to the second device 122, etc.

In a particular implementation, more than one action may be performed when particular criteria are satisfied. For example, when the device type satisfies the first criterion, in addition to granting the first device 124 access to the network subject to the first restriction level, the wireless access point 102 may send the access request 138 to the second device 122. The access request 138 may include information identifying the first device 124, such as a name, the SSID 134, the MAC ID 136, the device type, other information, or a combination thereof. The second device 122 may generate a display prompting the network administrator (e.g., a user of the second device 122) to approve or deny the access request 138. The access request 138 may also include a link (e.g., a uniform resource locator) or network address selectable to enable the network administrator to configure settings of the wireless access point 102, such as network access settings or securing settings associated with the first device 124. To illustrate, the network administrator may select the link to access a web page that can be used to set a network access level associated with the first device 124. In some examples, the web page may further enable the network administrator to assign a label to the first device 124. The label may be stored in memory 106 and future communications to the second device 122 regarding the first device 124 may identify the first device 124 by the label.

The wireless access point 102 may receive the response 140 to the access request 138 from the second device 122. The wireless access point 102 may determine, based on the response 140, whether to modify access available to the first device 124. For example, based on the response 140, the wireless access point 102 may grant the first device 124 access to the network subject to a second restriction level that is different from the first restriction level. In some examples, the second restriction level may provide greater access to resources of the network than the first restriction level. Alternatively, the wireless access point 102 may determine not to grant the first device 124 access to the network subject to the second restriction level based on the response 140. For example, the wireless access point 102 may deny all access to the network to the first device 124 based on the response 140. In some examples, the first device 124 may be prevented from accessing the network in the future based on the response 140. For example, the first device 124 (e.g., identified by the SSID 134, the MAC ID 136, or a combination thereof) may be added to a black list maintained in the memory 106 based on the response 140.

In response to determining to grant the first device 124 access subject to the second restriction level, the wireless access point 102 may send a second key to the first device 124 via a third message 147. The second key may be different from the first key and may be different from other keys used to communicate with other devices. For example, the encryption engine 110 or the key generator 114 may store data at the memory 106 to associate each key with a corresponding device. The wireless access point 102 may periodically (e.g., based on the timer 112) update keys (or receive updated keys) used to communication with various device. In an illustrative aspect, the access point 102 includes one timer 112 per key. When the timer 112 has a particular value, the key generator 114 may generate a new key, which may be provided to the first device 124 and subsequently used by the encryption engine 110 for communications with the first device 124. In this example, previous keys, such as the first key and the second key, cease to be valid after the new key is sent. Although keys are described herein as being generated at one device (e.g., the wireless access point 102) and sent to another device (e.g., the first device 124), in other implementations, a key exchange protocol is used. In a key exchange protocol, each device (e.g., the wireless access point 102 and the first device 124) may generate data that is exchanged and used to form the key. When such a key exchange protocol is used, the wireless access point 102 may initiate the key exchange based on the timer 112 having a particular value (e.g., 0).

In some implementations, the access point 102 may not send the third message 147. The first device 124 may determine whether access to the network subject to the second restriction level has been granted or whether all network access has been revoked by periodically attempting to transmit a message to another device coupled to the network. The first device 124 may be able to determine a status of network access based on whether a reply is received from the other device.

In some implementations, the wireless access point 102 may determine a threat indicator associated with the first device 124 while the first device 102 has access to the network subject to the first restriction level. To illustrate, the wireless access point 102 may monitor messages (e.g., transmissions) received by and/or from the first device 124 to determine whether the first device 124 is behaving in a manner that could be malicious (e.g., sending more than a threshold number of messages, attempting to communicate with particular ports, sending particular messages, etc.). In addition or in the alternative, the wireless access point 102 may compare a device identifier (e.g., the MAC ID 136) of the first device 124 to a list of identifiers associated with potentially malicious devices. In addition or in the alternative, the wireless access point 102 may send a query including device information 142 to an external source, such as the database 128 (e.g., a threat database). The device information 142 may include, for example, an identifier of the first device 124 (e.g., the SSID 134 or the MAC ID 136), a description or an analysis of the behavior of the first device 124, or a combination thereof. The database 128 may send threat information 144 to the wireless access point 102 based on the query including the device information 142. The wireless access point 102 may determine the threat indicator based on the analysis of the behavior of the first device 124, the threat information, the device identifier, the device information 142, or a combination thereof. The wireless access point 102 may also, or in the alternative, determine the threat indicator (e.g., a second threat indicator) associated with the first device 124 while the first device 124 has access subject to the second restriction level. As used herein, a threat indicator may include a score (e.g., a value) that indicates a probability that a device is malicious.

The wireless access point 102 may perform an action based on the threat indicator. For example, the threat indicator may have a value that indicates a likelihood that the first device 124 is malicious (or is associated with potentially malicious activity). In response to determining that the threat indicator exceeds a threat threshold, the wireless access point 102 may disallow the first device 124 access subject to the second restriction level, may disallow access subject to the first restriction level, or may disallow all access. The threshold may be received as user input or as part of a configuration file at the wireless access point 102. In another example, the wireless access point 102 may send a notification to the second device 122 indicating the threat indicator. If another action has also been performed, the notification may indicate the other action. For example, if the first device 124 had previously been granted access subject to the second restriction level and was denied access subject to the second restriction level based on the threat indicator, the notification may indicate that an access restriction of the first device 124 has been changed.

In a particular implementation, the wireless access point 102 may determine the threat indicator after granting the first device 124 access to the network subject to the first restriction level and before sending the access request 138. For example, the wireless access point 102 may monitor behavior of the first device 124 while the first device 124 is subject to the first restriction level. In another example, the wireless access point 102 may gather and send the device information 142 while the first device 124 is subject to the first restriction level. The wireless access point 102 may send the access request 138 to the second device 122 after the threat indicator is determined. In this implementation, the access request 138 may include the threat indicator or information derived from the threat indicator. For example, the access request 138 may include a numerical value of the threat indicator or may include a symbol or color code related to the threat indicator. To illustrate, a green color code may indicate that the first device 124 is considered to have a low threat level and a red color code may indicated that the first device 124 is considered to have a high threat level.

In a particular implementation, the wireless access point 102 may be configured to ignore requests for access while in a first mode and respond (or perform actions as described above) when in a second mode. For example, the wireless access point 102 may operate in the first mode until a command 130 is received. While in the first mode, a device, such as the third device 126, may send a message (e.g., a fourth message 148 in FIG. 1). The fourth message 148 may include a beacon message, an advertisement message, or a request for access. The wireless access point 102 may ignore (e.g., take no action) in response to the fourth message 148 while operating in the first mode.

In response to the command 130, the wireless access point 102 may begin operating in the second mode. While in the second mode, the wireless access point 102 may perform actions responsive to messages received from devices that have not already been granted access to the network. For example, the wireless access point 102 may receive the first message 132 while operating in the second mode, and may perform actions as described above.

Thus, the system 100 enables simplified management of a wireless network by automating certain tasks. For example, the wireless access point 102 may automatically grant the first device 124 restricted access to network based on a device type of the first device 124 without requiring the network administrator to approve granting such limited access. When the network administrator approves, additional (e.g., less restricted) access may be granted. As another example, the wireless access point 102 may automatically manage keys used to secure communications in the wireless network.

Figure 2:
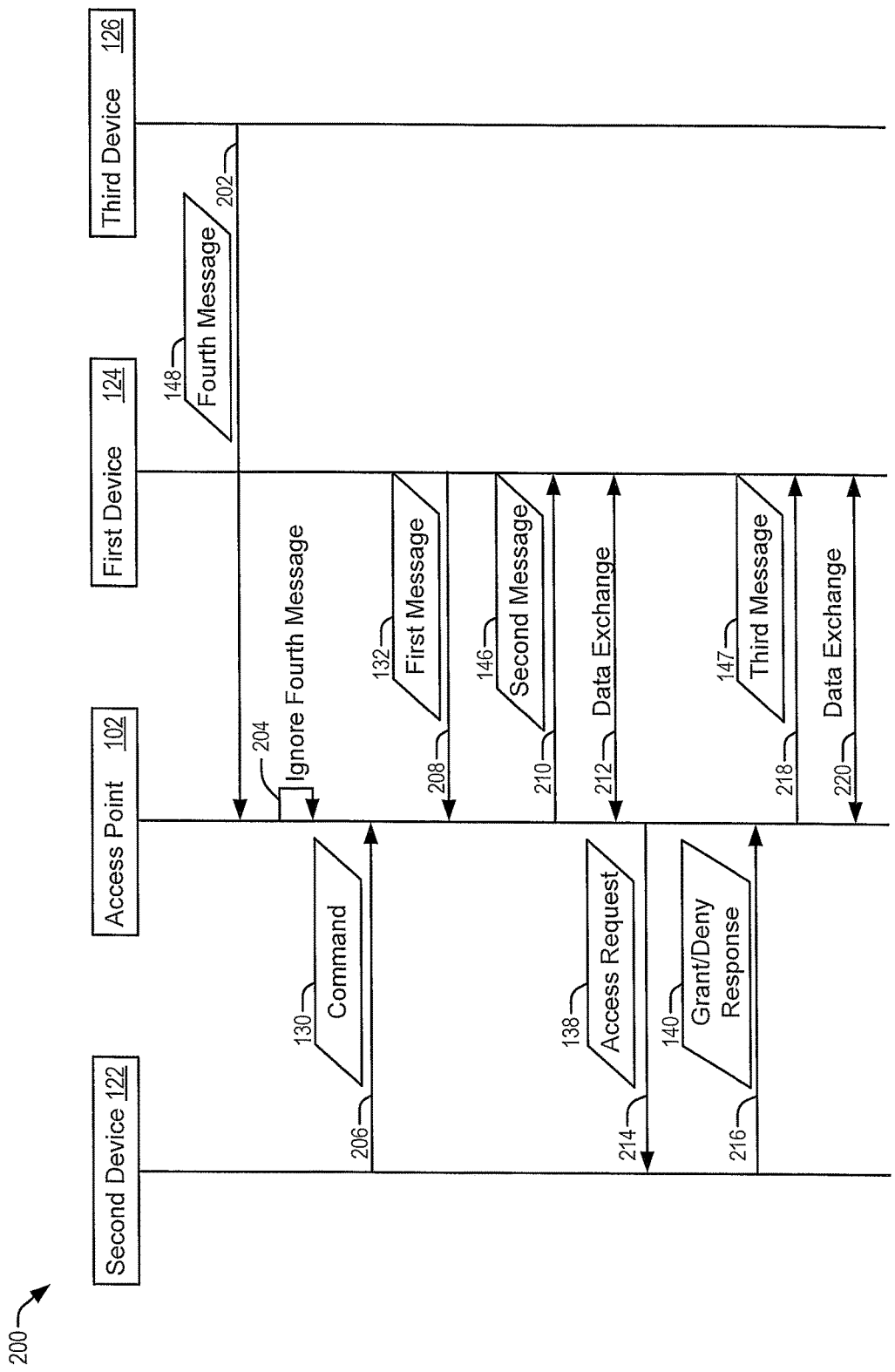
FIG. 2 is a diagram illustrating a particular example of communications within the system of FIG. 1.

FIG. 2 is a diagram 200 illustrating a particular example of communications within the system of FIG. 1. In particular, FIG. 2 illustrates communications between the second device 122, the wireless access point 102, the first device 124, and the third device 126 of FIG. 1. In the example illustrated in FIG. 2, the wireless access point 102 is initially operating in the first mode described above (e.g., a mode in which the wireless access point 102 does not automatically grant limited access to detected devices). At 202, the third device 126 transmits the fourth message 148 to the wireless access point 102. The fourth message 148 may include a beacon message, an advertisement message, or a request for access. At 204, the wireless access point 102 ignores (e.g., takes no action based on) the fourth message 148 since the wireless access point 102 is in the first mode.

At 206, the second device 122 transmits (e.g., via SMS) the command 130 to the wireless access point 102. As explained above, the second device 122 may be associated with an administrator of the wireless access point 102. In response to receiving the command 130, the wireless access point 102 may enter the second mode (e.g., a mode in which the access point may automatically grant access to detected wireless devices). At 208, the first device 124 transmits the first message 132 to the wireless access point 102. The first message 132 may identify the device type of the first device 124 (e.g., via the SSID 134 or the MAC ID 136). Since the wireless access point 102 is operating in the second mode when the wireless access point 102 receives the first message 132, the wireless access point 102 may determine whether to automatically grant the first device 124 access to the network subject to the first restriction level based on the device type, as described above.

At 210, the wireless access point 102 transmits the second message 146 to the first device 124. As explained above, the second message 146 may enable the first device 124 to access the network, subject to a first restriction level. For example, as explained above, the second message 146 may include an encryption key (e.g., a security key). At 212, the first device 124 and the wireless access point 102 may exchange data, subject to the first restriction level, as explained above.

At 214, the wireless access point 102 may transmit (e.g., via SMS) the access request 138 to the second device 122. At 216, the second device 122 may transmit the response 140 to the wireless access point 102. The wireless access point 102 may determine whether to grant the first device 124 access to the network subject to the second restriction level based on the response 140.

At 218, the wireless access point 102 transmits the third message 147 to the first device 124. The third message 147 may enable the first device 124 to access the network subject to the second restriction level. For example, the third message 147 may include a second encryption key. At 220, the first device 124 and the wireless access point 102 exchange data subject to the second restriction level.

Thus, FIG. 2 illustrates messages that may be exchanged by a system that enables simplified management of a wireless network by automating certain tasks. For example, FIG. 2 illustrates messages that may be exchanged by a system that manages access to a network.

Figure 3:
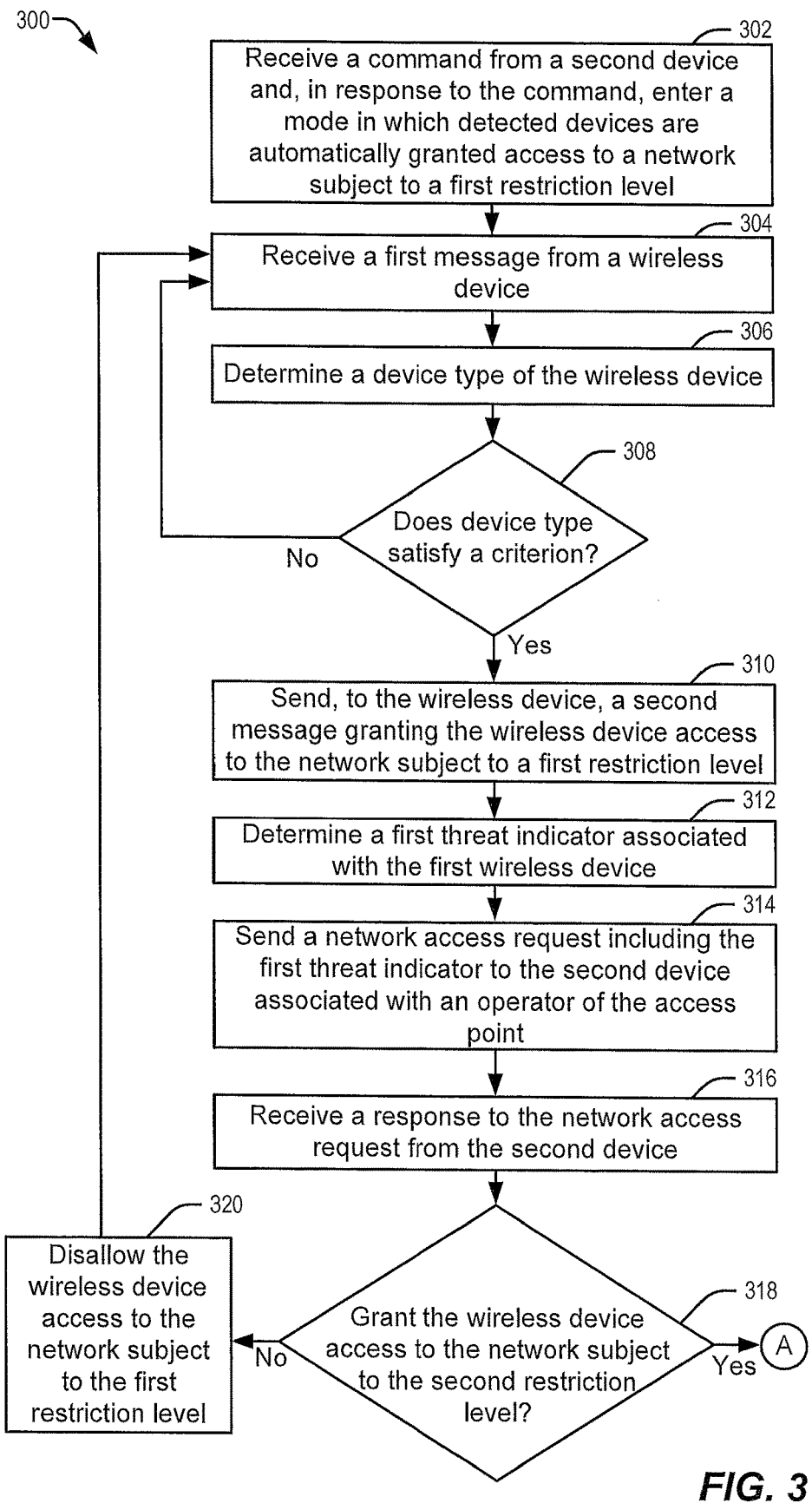
FIGS. 3 and 4 are a flowchart of a particular example of a method of managing network access.
Figure 4:
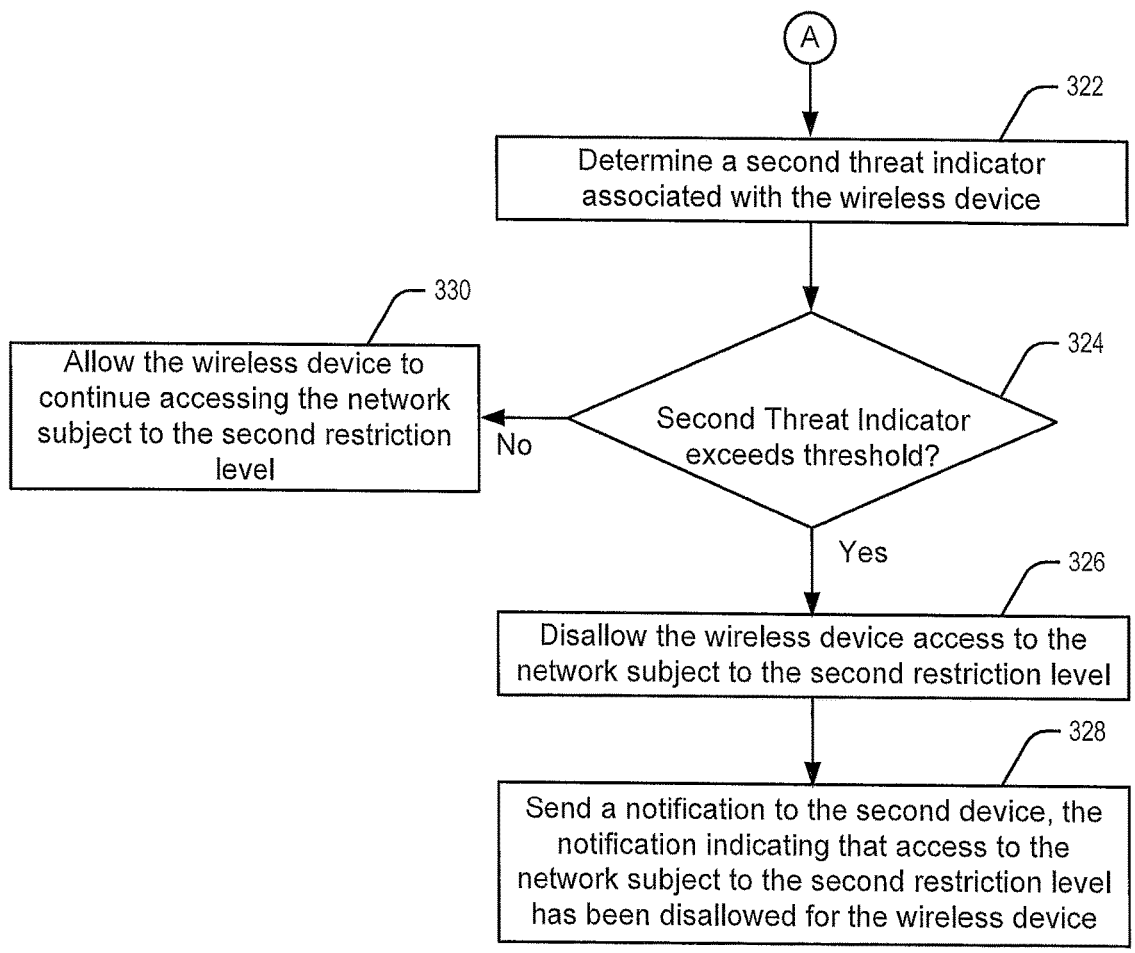

FIGS. 3 and 4 together illustrate a flowchart of a particular example of a method 300 of managing network access. The method 300 may be performed by an access point, such as the wireless access point 102 of FIG. 1.

The method 300 may include receiving a command from a second device and, in response to the command, entering a mode in which detected devices are automatically granted access to a network subject to a first restriction level, at 302. For example, the wireless access point 102 may receive the command 130. In response to the command 130, the wireless access point 102 may enter the second mode in which devices area automatically granted (e.g., based on device type) access to the network subject to a first restriction level.

The method 300 may further include receiving a first message from a wireless device, at 304. For example, the wireless access point 102 may receive the first message 132 from the first device 124. The first message 132 may include the SSID 134 and/or the MAC ID 136. The method 300 may further include determining a device type of the wireless device, at 306. To illustrate, the wireless access point 102 may send the SSID 134, the MAC ID 136, other information received from the first device 124, or a combination thereof, in a query to the database 128 and may receive an indication of the device type from the database 128 in response to the query.

The method 300 may further include determining whether the device type satisfies a criterion, at 308. For example, the criterion may be satisfied when the device has a first device type (or one of first plurality of device types) and may not be satisfied with the device does not have the first device type (or one of the first plurality of device types) (e.g., has a second device type or the device type is unknown). When the device type does not satisfy the criterion, the method 300 may include returning to 304.

When the device type does satisfy the criterion, the method 300 may further include sending, to the wireless device, a second message granting the wireless device access to the network subject to a first restriction level, at 310. For example, the wireless access point 102 may send the second message 146 to the first device 124 in response to determining that the device type of the first device 124 satisfies the criterion. The second message 146 may grant the first device 124 access to the network. For example, the second message 146 may include an encryption key that the first device 124 may use to access the network subject to the first restriction level. In addition or in the alternative the second message 146 may include other information, such as an Internet protocol address assignment, dynamic host configuration protocol information, domain name system/subnet information, or a combination thereof.

The method 300 may further include determining a first threat indicator associated with the first wireless device, at 312. For example, the wireless access point 102 may determine the first threat indicator by monitoring messages transmitted by the first device 124, by transmitting the device information 142 to the database 128 and receiving the threat information 144, or a combination thereof.

The method 300 may further include, at 314, sending a network access request including the first threat indicator to the second device associated with an operator of the access point. For example, the wireless access point 102 may send (e.g., via SMS) the access request 138 to the second device 122. The access request 138 may include the first threat indicator.

The method 300 may further include receiving a response to the network access request from the second device, at 316. For example, the wireless access point 102 may receive the response 140 from the second device 122. The method 300 may further include determining whether to grant the wireless device access to the network subject to the second restriction level based on the response, at 318. For example, the wireless access point 102 may determine whether to grant the first device 124 access to the network subject to the second restriction level based on the response 140. When the access point determines not to grant the wireless device access to the network subject to the second restriction level, the method 300 may further include disallowing the wireless device access to the network subject to the first restriction level, at 320 and the method 300 may return to 304.

Returning to 318, when the wireless access point determines to grant the wireless device access to the network subject to the second restriction level, the method 300 may include determining a second threat indicator, at 322. For example, the wireless access point 102 may send the third message 147 to the first device 124 granting the first device 124 access to the network subject to the second restriction level. The wireless access point 102 may monitor messages transmitted by the first device 124 to determine the second threat indicator. At 324, the method 300 includes determining whether the second threat indicator exceeds a threshold. For example, the wireless access point 102 may compare the second threat indicator to a threshold received as user input or as part of a configuration file. When the second threat indicator does not exceed the second threshold, the method 300 includes permitting the wireless device to continue accessing the network subject to the second restriction level, at 330. For example, the wireless access point 102 may continue to permit the first device 124 to access the network subject to the second restriction level in response to determining that the second threat indicator does not exceed the threshold.

When the second threat indicator does exceed the threshold, the method 300 includes disallowing the wireless device access to the network subject to the second restriction level, at 326. For example, in response to determining that the second threat indicator exceeds the threshold, the wireless access point 102 may prevent the first device 124 from accessing the network subject to the second restriction. In some examples, the wireless access point 102 may prevent the first device 124 from accessing the network subject to any restriction level. In an illustrative embodiment, the wireless access point 102 may stop transmitting messages to the first user device 124 and may stop forwarding messages received from the first user device 124. In addition or in the alternative, the wireless access point 102 may revoke/expire an Internet protocol address, an encryption key, a certificate, or a combination thereof assigned to the first user device 124. In some examples, the first device 124 may output a second notification in response to losing access to the network. The second notification may include text, audio, video, an image, or a combination thereof. To illustrate, the second notification may include text that states "Your access to [network_id] network has been revoked," [where network_id] is an SSID of the network. The second notification may be output by an output device associated with (e.g., integrated into, coupled to, in communication with) the first device 124. The output device may include a speaker, a display device, or a combination thereof. In some examples, the second notification may be stored in a memory device of the first device 124. In particular examples, the notification may be sent from the access point 102 to the first device 124.

The method 300 may further include sending a notification to the second device, the notification indicating that access to the network subject to the second restriction level has been disallowed for the wireless device, at 328. In some embodiments, the sequence of the method blocks may be different than is shown. For example, the method 300 may include 328 before 326.

Thus, the method 300 enables managing network access. Systems operating according to the method 300 may grant and revoke access to a network subject to various restriction levels. Access to the network subject to some restriction levels may be granted automatically according to the method 300.

In conjunction with structure, devices, and methods described herein, methods and systems are provided that enable managing network access. In particular, the methods and systems may enable an access point to automatically grant a wireless device access to a network subject to a first restriction level. Further, the methods and systems may enable the access point to grant the wireless device access to the network subject to a second restriction level without requiring the a user of the wireless device to know a security key associated with the network. For example, the wireless access point 102 of FIG. 1 may automatically grant the first device 124 access to the network subject to the first restriction level in response to the first message 132. In addition, the wireless access point 102 may grant the first device 124 access to the network subject to the second restriction level based on the response 140 received from the second device 122 rather than requiring a user of the first device 124 to know or have access to a security key, a password, or other authentication credential.

Figure 5:
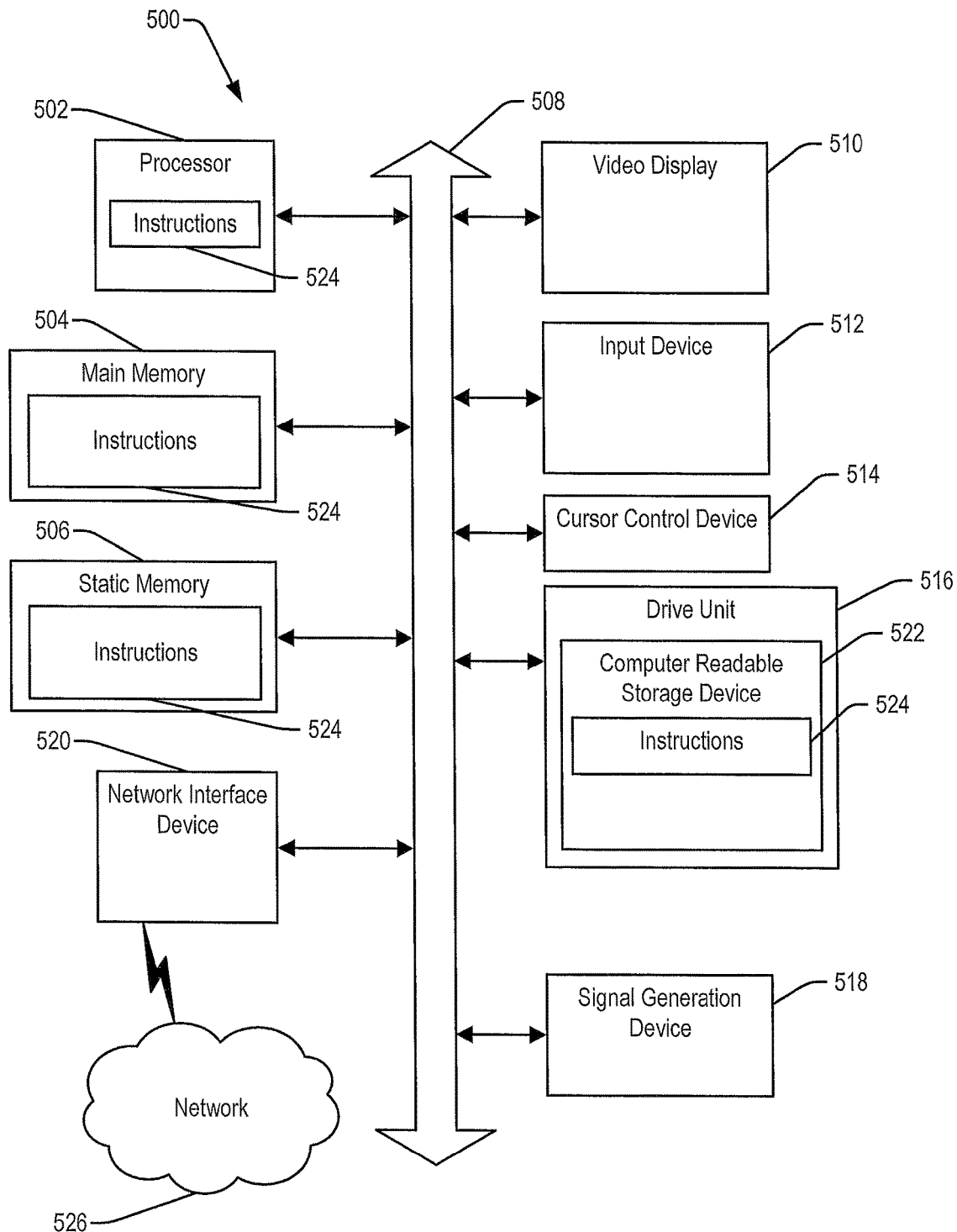
FIG. 5 is a block diagram of an example of a computer system, such as a wireless device or an access point, of the system of FIG. 1.

FIG. 5 is a block diagram of an example of a computer system 500, such as a user device or a server, of the system 100 of FIG. 1. For example, the computer system 500 of FIG. 5 may include, be included within, or correspond to the computing wireless access point 102, the first device 124, the second device 122, the third device 126, or the database 128 of FIG. 1. The computer system 500 includes a set of instructions 524 or multiple sets of instructions that can be executed to cause the computer system 500 to perform any one or more of the methods or computer-based functions disclosed herein. To illustrate, in an implementation in which the computer system 500 corresponds to the wireless access point 102, the computer system 500 may manage access to a network, as described herein. In an implementation in which the computer system 500 corresponds to the one of the first device 124 or third device 126, the computer system 500 may include broadcast server instructions for accessing a network. In an implementation in which the computer system 500 corresponds to the database 128, the computer system 500 may include instructions for responding to queries including device information (e.g., the device information 142) with threat information (e.g., the threat information 144).

The computer system 500 or may be connected, e.g., using a network 526, to other computer systems or peripheral devices. In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a mobile device, a wearable device, a vehicular (e.g., automotive) head unit, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular example, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502 (or multiple processors), e.g., a central processing unit (CPU), a graphics processing unit (GPU), or both. Moreover, the computer system 500 may include a main memory 504 and a static memory 506, which can communicate with each other via a bus 508.

The computer system 500 may further include a video display unit 510, such as a liquid crystal display (LCD), a light emitting diode (LED) display, a touch screen display, a flat panel display, or a solid state display. Additionally, the computer system 500 may include an input device 512, such as a remote control device or a keyboard, and a cursor control device 514, such as a mouse. In some implementations, the input device 512 and the cursor control device 514 may be integrated into a single device, such as a capacitive touch screen input device. The computer system 500 may also include a signal generation device 518, such as a speaker, and a network interface device 520. Some computer systems 500 may not include an input device (e.g., a server may not include an input device).

In the particular example illustrated in FIG. 5, the computer system 500 includes a drive unit 516 that includes computer-readable storage 522 (i.e., a computer-readable storage device) in which one or more sets of instructions 524, e.g. software, can be embedded. The computer-readable storage 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 524 may be executable to perform operations of one or more of the methods or logic as described herein. For example, the instructions 524 may be executable by the processor 502 to perform one or more functions or methods described herein, such as the method 300 of FIGS. 3-4. The instructions 524 may reside completely, or at least partially, within the main memory 504, the static memory 506, and/or within the processor 502 during execution by the computer system 500.

In an alternative implementation, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 522 that stores instructions 524, so that a device connected to the network 528 may communicate voice, video or data over the network 528. While the computer-readable storage 522 is shown to be a single device, the computer-readable storage 522 may include a single device or multiple devices, such as a centralized or distributed database, and/or associated caches and servers that store one or more sets of instructions. The computer-readable storage 522 is capable of storing a set of instructions for execution by a processor to cause a computer system to perform any one or more of the methods or operations disclosed herein.

In a particular non-limiting, exemplary embodiment, the computer-readable storage 522 may include a solid-state memory such as embedded memory (or a memory card or other package that houses one or more non-volatile read-only memories). Further, the computer-readable storage 522 may be a random access memory or other volatile re-writable memory. Additionally, the computer-readable storage 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 500 in selected embodiments.

The illustrations of the examples, particular implementations, and embodiments described herein are intended to provide a general understanding of the structure of the various embodiments. The illustrations are not intended to serve as a complete description of all of the elements and features of apparatus and systems that utilize the structures or methods described herein. Many other examples, implementations and/or embodiments may be apparent to those of skill in the art upon reviewing the disclosure. Other examples, implementations and/or embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific examples, implementations and embodiments have been illustrated and described herein, it should be appreciated that any subsequent arrangement designed to achieve the same or similar purpose may be substituted for the specific embodiments shown. This disclosure is intended to cover any and all subsequent adaptations or variations of the disclosed subject matter.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving, at an access point of a network, a first message from a wireless device via the network;
    determining a device type of the wireless device; and
    in response to determining that the device type satisfies a criterion:
        sending, to the wireless device, a second message granting the wireless device access to the network subject to a first restriction level that limits bandwidth usage of the network by the wireless device, wherein the second message includes a first key to grant the wireless device access to the network subject to the first restriction level; and
        sending a network access request to a second device associated with an operator of the access point;
    receiving a response to the network access request from the second device; and
    determining, based on the response, whether to grant the wireless device access to the network subject to a second restriction level, the second restriction level less restrictive than the first restriction level.

2. The method of claim 1, further comprising determining a threat indicator associated with the wireless device after sending the second message, wherein the network access request includes the threat indicator.

3. The method of claim 2, wherein determining the threat indicator includes monitoring transmissions of the wireless device and comparing the transmissions to stored examples of malicious activity.

4. The method of claim 2, wherein determining the threat indicator includes:
    sending a query identifying the wireless device to a threat database; and
    receiving the threat indicator from the threat database.

5. The method of claim 1, further comprising, in response to determining to grant the wireless device access to the network subject to the second restriction level, sending a third message to the wireless device, the third message including a second key to grant the wireless device access to the network subject to the second restriction level.

6. The method of claim 5, further comprising:
    after granting the wireless device access to the network subject to the second restriction level, determining a threat indicator associated with the wireless device; and
    based on the threat indicator exceeding a threshold, disallowing the wireless device access to the network subject to the second restriction level.

7. The method of claim 1, wherein the first restriction level enables the wireless device to access a local area network associated with the access point and denies the wireless device access to a wide area network.

8. The method of claim 1, wherein the first restriction level enables the wireless device to send data to a particular network address, receive data from the particular network address, or both, the particular network address included in a list of network addresses allowed to be accessed via the access point.

9. The method of claim 1, further comprising:
    after sending the second message to the wireless device and prior to granting the wireless device access to the network subject to the second restriction level:
        receiving from the wireless device a request to access the network; and
        denying the request in response to determining that an operation indicated by the request exceeds the first restriction level.

10. The method of claim 9, further comprising granting the request in response to granting, based on the response, the wireless device access to the network subject to the second restriction level.

11. An apparatus comprising:
    a processor; and
    a memory storing instructions executable by the processor, the instructions executable by the processor to cause the processor to perform operations comprising:
        receiving a first message from a wireless device via a network;
        determining a device type of the wireless device; and
        in response to determining that the device type satisfies a criterion:
            causing a second message to be sent to the wireless device, the second message granting the wireless device access to the network subject to a first restriction level that limits bandwidth usage of the network by the wireless device, wherein the second message includes a first key to grant the wireless device access to the network subject to the first restriction level;
            causing a network access request to be sent to a second device;
            receiving a response to the network access request from the second device; and
            determining, based on the response, whether to grant the wireless device access to the network subject to a second restriction level, the second restriction level less restrictive than the first restriction level.

12. The apparatus of claim 11, further comprising an interface configured to send the network access request to the second device.

13. The apparatus of claim 11, further comprising an encryption engine configured to encrypt data sent to the wireless device using the first key while access by the wireless device is subject to the first restriction level.

14. The apparatus of claim 11, wherein the operations further comprise, based on the response indicating to deny the wireless device access to the network, disallowing the wireless device access to the network.

15. The apparatus of claim 11, further comprising a timer and an encryption engine, wherein the encryption engine is configured to encrypt data sent to the wireless device using an encryption key that is changed periodically based on the timer.

16. The apparatus of claim 11, further comprising a sandbox controller configured to establish a sandbox corresponding to the first restriction level by managing access of the wireless device to resources of the network.

17. The apparatus of claim 11, further comprising a key generator configured to generate an encryption key used to encrypt data exchanged with the wireless device.

18. A computer-readable storage device storing instructions executable by a processor to cause the processor to perform operations comprising:
   receiving a first message from a wireless device via a network;
   determining a device type of the wireless device; and
   in response to determining that the device type satisfies a criterion:
      causing a second message to be sent to the wireless device, the second message granting the wireless device access to the network subject to a first restriction level that limits bandwidth usage of the network by the wireless device, wherein the second message includes data for generating a first key to grant the wireless device access to the network subject to the first restriction level;
      causing a network access request to be sent to a second device;
      receiving a response to the network access request from the second device; and
      determining, based on the response, whether to grant the wireless device access to the network subject to a second restriction level, the second restriction level less restrictive than the first restriction level.

19. The computer-readable storage device of claim 18, wherein the operations further comprise, in response to determining not to grant the wireless device access to the network subject to the second restriction level, adding an identifier of the wireless device to a list of devices to be denied access to the network.

* * * * *